(12) United States Patent
Brown (10) Patent No.: US 8,779,745 B2
(45) Date of Patent: Jul. 15, 2014

(54) THREE-QUARTER BRIDGE POWER CONVERTERS FOR WIRELESS POWER TRANSFER APPLICATIONS AND OTHER APPLICATIONS

(75) Inventor: James Steven Brown, Alviso, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 106 days.

(21) Appl. No.: 13/034,975

(22) Filed: Feb. 25, 2011

(65) Prior Publication Data

US 2011/0211380 A1      Sep. 1, 2011

Related U.S. Application Data

(60) Provisional application No. 61/339,166, filed on Mar. 1, 2010.

(51) Int. Cl.
*G05F 1/00* (2006.01)

(52) U.S. Cl.
USPC .......................................................... 323/285

(58) Field of Classification Search
USPC ........... 323/282, 285; 363/21.06, 39, 65, 131, 363/132; 307/21, 23–25, 28, 29, 43–46
See application file for complete search history.

(56) References Cited

U.S. PATENT DOCUMENTS

| | | | |
|---|---|---|---|
| 6,271,651 B1 * | 8/2001 | Stratakos et al. | 323/282 |
| 6,370,051 B1 * | 4/2002 | Patel | 363/132 |
| 6,838,860 B2 * | 1/2005 | Huggett et al. | 322/46 |
| 7,227,277 B2 | 6/2007 | Chapman et al. | |
| 7,256,568 B2 | 8/2007 | Lam et al. | |
| 8,278,784 B2 * | 10/2012 | Cook et al. | 307/149 |
| 8,338,991 B2 * | 12/2012 | Von Novak et al. | 307/104 |
| 2004/0246756 A1 * | 12/2004 | Bijlenga et al. | 363/132 |
| 2006/0049813 A1 | 3/2006 | Hendrix | |
| 2008/0239772 A1 | 10/2008 | Oraw et al. | |

OTHER PUBLICATIONS

Notification of Transmittal of the International Search Report and the Written Opinion of the International Searching Authority, or the Declaration dated Oct. 17, 2011 in connection with International Patent Application No. PCT/US2011/026631.
"LM5035, PWM Controller with Integrated Half-Bridge and SyncFET Drivers", National Semiconductor Corporation, Dec. 2, 2008, 28 pages.
"LMD18245, 3A, 55V DMOS Full-Bridge Motor Driver", National Semiconductor Corporation, Mar. 2006, 21 pages.

* cited by examiner

*Primary Examiner* — Adolf Berhane
*Assistant Examiner* — Yemane Mehari
(74) *Attorney, Agent, or Firm* — Andrew Viger; Fredrick J. Telecky, Jr.

(57) ABSTRACT

A three-quarter bridge power converter includes a first switch configured to selectively couple a switch node to a higher voltage. The power converter also includes a second switch configured to selectively couple the switch node to a lower voltage. The power converter further includes a third switch configured to selectively cause a third voltage to be provided to the switch node when the first and second switches are not coupling the switch node to the higher and lower voltages. The third switch may be configured to selectively couple the switch node to an energy storage or energy source, such as a capacitor. The third switch may also be configured to selectively couple an energy storage or energy source to ground, where the energy storage or energy source is coupled to the switch node.

20 Claims, 6 Drawing Sheets

THREE-QUARTER BRIDGE POWER CONVERTERS FOR WIRELESS POWER TRANSFER APPLICATIONS AND OTHER APPLICATIONS

CROSS-REFERENCE TO RELATED APPLICATION AND PRIORITY CLAIM

This application claims priority under 35 U.S.C. §119(e) to U.S. Provisional Patent Application No. 61/339,166 filed on Mar. 1, 2010, which is hereby incorporated by reference.

TECHNICAL FIELD

This disclosure relates generally to power converters. More specifically, this disclosure relates to three-quarter bridge power converters for wireless power transfer applications and other applications.

BACKGROUND

Various power conversion architectures have been developed and used in a wide range of applications. Two common power conversion architectures are half bridge architectures and full bridge architectures.

In half bridge architectures using symmetrical drive, a disadvantage is that, at anything less than a maximum drive duty factor, there are "dead times" during which switches in the half bridge are not active (conducting). This can cause currents to flow through the body diodes of the switches, resulting in significant losses (often on an order of equal to or greater than $I^2R$ losses). Placing Schottky diodes in parallel with the switches can help but can still result in significant Schottky losses during some operating conditions. While asymmetrical drive can solve the dead time problem, a disadvantage is that it typically results in poor waveform quality, which can require much lower impedance in a matching network. This increases half bridge circulating RMS current, which again increases losses.

Full bridge architectures with phase modulation can solve the dead time problem since current always flows though two actuated switches. However, full bridge architectures force a load to be driven differentially at a high common mode voltage, which can be a significant drawback in certain applications.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIGS. 1 through 6 illustrate example three-quarter bridge power converters and related details according to this disclosure. These new three-quarter bridge power converter topologies can be used in a wide range of applications. A three-quarter bridge power converter can significantly reduce or substantially eliminate commutating diode conduction losses associated with symmetrical pulse width modulated (PWM) half bridge power converters, while maintaining many of the advantages of a basic half bridge architecture.

An example of where this approach may be useful is in magnetically-coupled wireless power transfer environments. In these types of environments, a power "transmitter" (the primary side of a transformer) is physically separate from a power "receiver" (the secondary side of the transformer). The power transmitter represents any suitable structure for transmitting power, and the power receiver represents any suitable structure for receiving power. Effectively, the primary side of the transformer resides in one physical device, and the secondary side of the transformer resides in a completely separate device. Additionally, the receiver (secondary) coils may be of various shapes and sizes, and the transmitter and receiver may be manufactured by different companies. Altogether, this environment presents several challenges that are unique compared to other isolated power transfer schemes:

The exact coupling coefficient k is unknown and lower than typical in an isolated power converter, so the transformation ratio may not be easily predicted;

To minimize electro-magnetic interference (EMI) and enable the use of reactive impedance matching, waveforms should be as sinusoidal as possible;

The primary and secondary sides are not on the same core and the transmitter coil may be much larger than the receiver coil, so magnetic flux lines may exist that are not contained in the core; and For simplifying instrumentation and facilitate switching between a matrix of multiple transmit coils, it may be desirable to couple one side of the transmit (primary) coil to ground. The three-quarter bridge power converters shown and described below can be used in these or other environments to reduce power losses during operation.

Figure 1:
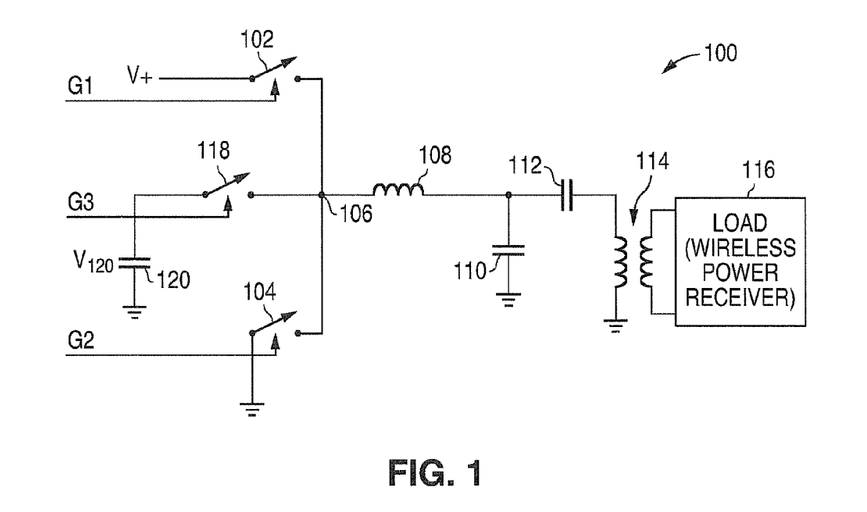
FIGS. 1 through 6 illustrate example three-quarter bridge power converters and related details according to this disclosure.

FIG. 1 illustrates a first example three-quarter bridge power converter 100. As shown in FIG. 1, the power converter 100 includes switches 102-104, which may represent the typical switches used in a half bridge power converter architecture. The switch 102 is coupled to receive a supply voltage V+, and the switch 104 is coupled to ground. The V+ and ground voltages represent rail voltages. The switch 102 can selectively couple the supply voltage V+ to a switch node 106 under the control of a control signal G1. The switch 104 can selectively couple the switch node 106 to ground under the control of a control signal G2. Each of the switches 102-104 includes any suitable switching structure, such as a MOSFET or other transistor device.

The switch node 106 is coupled to an inductor 108, which in this example is coupled to an output capacitor 110 and a direct current (DC) blocking capacitor 112. The inductor 108 represents any suitable inductive structure having any suitable inductance. Each of the capacitors 110-112 represents any suitable capacitive structure having any suitable capacitance.

The capacitor 112 is also coupled to a coil, which in this example represents the primary side of a transformer 114. The secondary side of the transformer 114 is coupled to a load 116. The transformer 114 includes any suitable structure for transferring power in an isolated manner. Each side of the transformer 114 could have any suitable structure, such as a coil with any number of turns. As noted above, the primary side of the transformer 114 could include a matrix of different transmit coils that can be switched into and out of the power converter 100.

A third switch 118 is added in the power converter 100 to form the three-quarter bridge architecture. The third switch 118 selectively couples the switch node 106 to an energy storage or energy source. In this case, the energy storage or source is a power storage component formed by a capacitor 120, although any other suitable energy source or storage component(s) could be used. The capacitor 120 includes any suitable capacitive structure having any suitable capacitance. In some embodiments, ripple can be a strict function of current flow during the on-time of the switch 118. In practice, it may be beneficial to limit the ripple in the capacitor 120 to a few hundred millivolts in order to reduce or minimize dielectric losses in the capacitor 120. This can be accomplished by increasing the size of the capacitor 120.

The switch 118 can selectively couple the switch node 106 to the energy storage or source under the control of a control signal G3. The switch 118 includes any suitable structure for coupling an energy storage or source to a specified node. For example, the switch 118 may represent a structure providing bidirectional blocking capability. In some embodiments, the switch 118 can be implemented using MOSFET transistors (or other types of transistors) coupled in series. For instance, the switch 118 could be formed using two MOSFETs having their source terminals coupled together and their gate terminals configured to receive the control signal G3. The drain terminals of the MOSFETs could be coupled to the energy storage or source and the switch node 106. In particular embodiments, the power converter 100 may use a total of four MOSFET or other switches.

During operation, the control signals G1 and G2 (for controlling the switches 102-104) can be identical to those used in half bridge architectures. The control signal G3 (for controlling the switch 118) can be asserted (on) whenever both control signals G1 and G2 are not asserted (off). As a result, when the switches 102-104 are both turned off (not conducting), the switch 118 is turned on (conducting). A voltage on the switch node 106 may therefore be similar to that of a half bridge except that, during the on-time of the switch 118, the voltage is clamped to a voltage $V_{120}$ stored on the capacitor 120 (or a voltage from another energy storage or source). Depending on the implementation, the voltage $V_{120}$ could average one-half of the supply voltage V+.

In this way, the three-quarter bridge power converter 100 can reduce or eliminate "dead time" during its operation so that, at all times, the switch node 106 is connected to a power rail, a power storage component, or some other energy storage or source. This can substantially eliminate commutation diode conduction losses.

The load 116 represents any suitable structure for receiving power from the power converter 100. The load 116 could, for instance, include a wireless power receiver for receiving power wirelessly from the power converter 100. The wireless power receiver could form part of a larger device, such as a mobile telephone, portable computer, or other electronic device. The load 116 could also represent a motor, such as a reversible DC or AC motor. Any other suitable load 116 could be used, such as an RL load.

Figure 2:
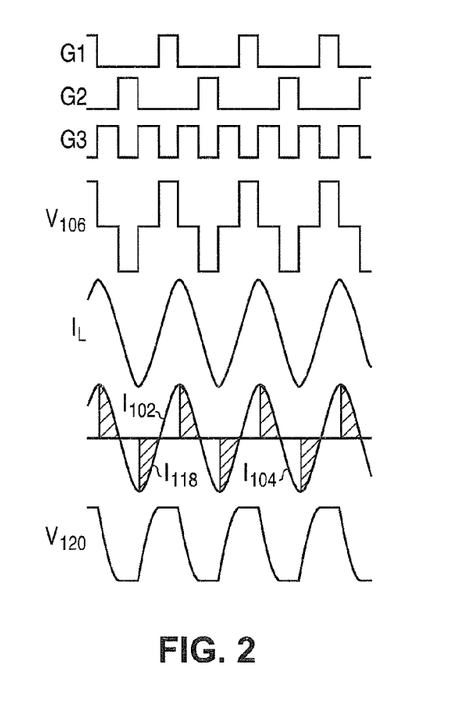

FIG. 2 illustrates example simulated waveforms related to the three-quarter bridge power converter 100 of FIG. 1. As shown in FIG. 2, the control signals G1 and G2 contain pulses for turning on the switches 102-104. If the control signals G1 and G2 define a 50% duty factor, there would be no dead time when neither switch 102-104 is conducting. However, as shown in FIG. 2, there can be significant dead time between pulses in the control signals G1 and G2 at lower duty factors. As noted above, the control signal G3 pulses high at times when both control signals G1 and G2 are low, thereby activating the switch 118 to couple the node 106 to the capacitor 120. This helps to reduce or eliminate the dead time in the power converter 100.

FIG. 2 also illustrates the voltage on the switch node 106 ($V_{106}$), the current through the inductor 108 ($I_L$), and the voltage on the capacitor 120 ($V_{120}$). In addition, FIG. 2 illustrates the currents through the three switches 102, 104, 118 ($I_{102}$, $I_{104}$, and $I_{118}$). As shown in FIG. 2, the voltage $V_{106}$ on the switch node 106 does not merely swing between high and low levels as the switches 102-104 alternately couple the switch node 106 to the source voltage V+ and ground. In between those times (which would otherwise be dead time), the switch node 106 is coupled to the capacitor 120 and, in this example, receives a voltage that is approximately one-half of the source voltage V+.

The simulated waveforms here show a particular control signal-to-inductor current $I_L$ phase relationship. This is a function of a resonant frequency and an operating frequency chosen for the simulation. Different selections can result in different phase relationships. Operation of the three-quarter bridge power converter 100 does not specifically require that a resonant circuit at all switch currents ($I_{102}$, $I_{104}$, and $I_{118}$) account for full 360° of the conducted current $I_L$, so in theory the current $I_L$ may always flow in a low resistive path. In practice, some non-overlapping time between switch operations is typically used to ensure that there is no current shoot-thru.

Figure 3:
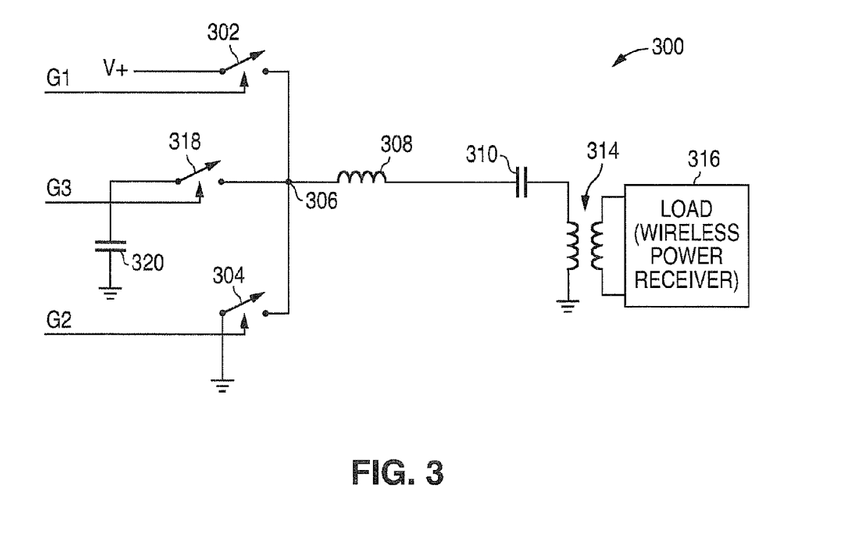

FIG. 3 illustrates a second example three-quarter bridge power converter 300. As shown in FIG. 3, the power converter 300 includes switches 302-304 coupled to a switch node 306, an inductor 308, and an output capacitor 310. The capacitor 310 is coupled to a coil, which in this example represents the primary side of a transformer 314. A load 316 is coupled to the secondary side of the transformer 314 and could represent a wireless power receiver. A switch 318 couples an energy storage or source such as a capacitor 320 to the switch node 306. In FIG. 3, the power converter 300 operates using a series resonance formed by the inductor 308, the output capacitor 310, and the primary side of the transformer 314.

Figure 4:
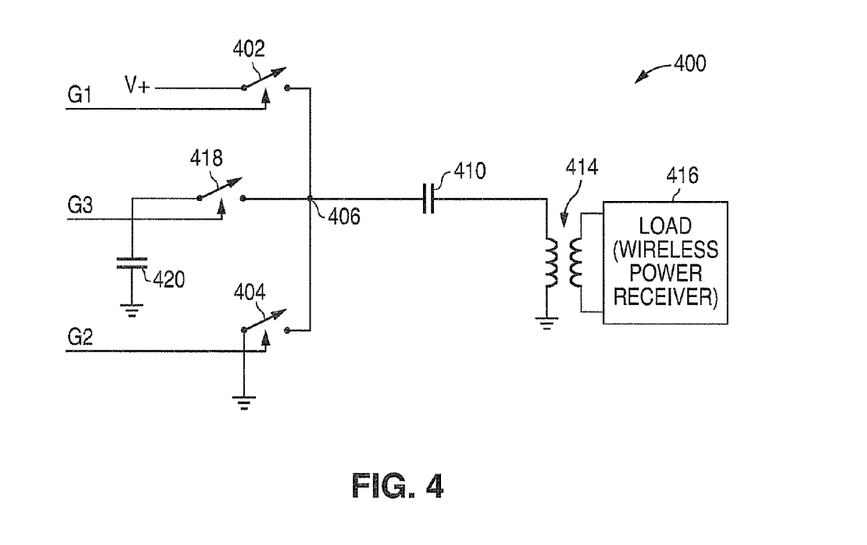

FIG. 4 illustrates a third example three-quarter bridge power converter 400. As shown in FIG. 4, the power converter 400 includes switches 402-404 coupled to a switch node 406. An output capacitor 410 is coupled to the switch node 406 and a coil, which in this example represents the primary side of a transformer 414. A load 416 is coupled to the secondary side of the transformer 414 and could represent a wireless power receiver. A switch 418 couples an energy storage or source such as a capacitor 420 to the switch node 406. In FIG. 4, the power converter 400 operates using a series resonance formed by the output capacitor 410 and leakage inductance of the primary side of the transformer 414.

Figure 5:
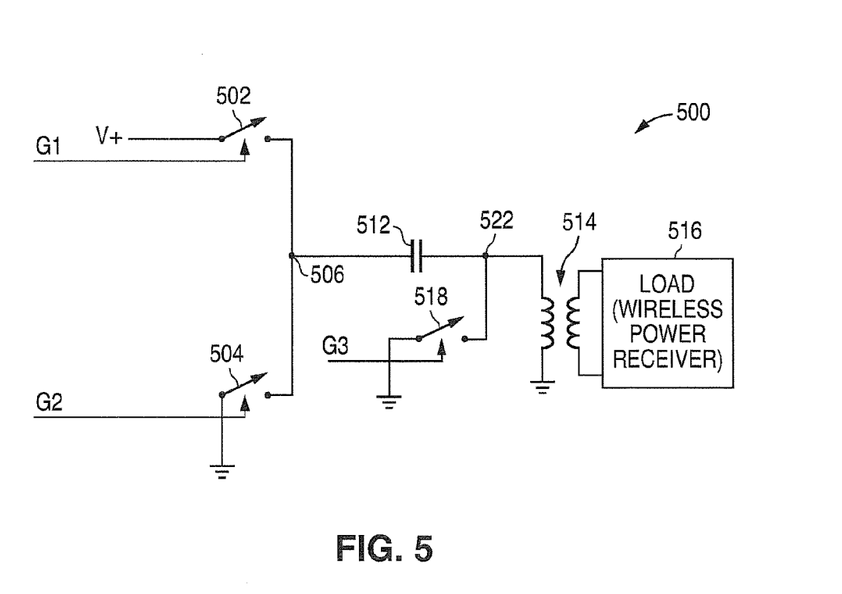

FIG. 5 illustrates a fourth example three-quarter bridge power converter 500. As shown in FIG. 5, the power converter 500 includes switches 502-504 coupled to a switch node 506.

A DC blocking capacitor 512 is coupled to the switch node 506 and to a coil, which here represents the primary side of a transformer 514. A load 516 is coupled to the secondary side of the transformer 514. A switch 518 is coupled to a node 522 between the DC blocking capacitor 512 and the transformer 514. The switch 518 selectively couples the node 522 to ground. In FIG. 5, the power converter 500 operates in a non-resonant manner. However, the switch 518 can still be turned on during the non-conducting times of the switches 502-504 to avoid problems associated with dead times. In this embodiment, the capacitor 512 is effectively acting as the energy storage or source that is coupled to the switch node 506, and the switch 518 causes the voltage on the capacitor 512 to be seen at the switch node 506.

Figure 6:
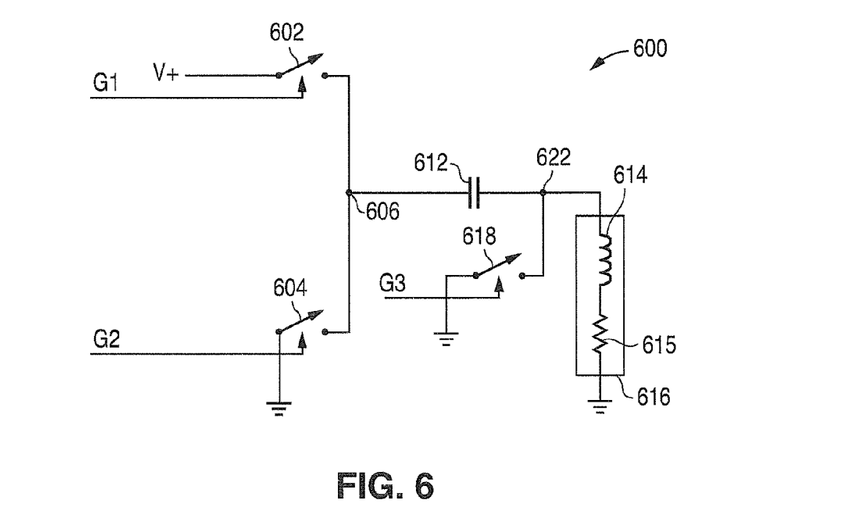

FIG. 6 illustrates a fifth example three-quarter bridge power converter 600. As shown in FIG. 6, the power converter 600 includes switches 602-604 coupled to a switch node 606. A DC blocking capacitor 612 is coupled to the switch node 606 and to a load 616, which in this example is represented by an inductor 614 and a resistor 615. A switch 618 is coupled to a node 622 between the DC blocking capacitor 612 and the load 616. The switch 618 selectively couples the node 622 to ground. In FIG. 6, the power converter 600 operates in a non-resonant and non-isolated manner with an inductive load rather than a wireless power transfer system. Once again, however, the switch 618 can still be turned on during the non-conducting times of the switches 602-604 to avoid problems associated with dead times. In this embodiment, the capacitor 612 is effectively acting as the energy storage or source that is coupled to the switch node 606, and the switch 618 causes the voltage on the capacitor 612 to be seen at the switch node 606.

Compared to conventional half bridge architectures, three-quarter bridge power converters can have improved efficiency without compromising waveform symmetry. Compared to conventional full bridge architectures, three-quarter bridge power converters can have a transformer with a primary side connected to ground, which may facilitate easy switching among a matrix of transmit coils and easy measurements of transformer voltages and currents.

Although FIGS. 1 through 6 illustrate examples of three-quarter bridge power converters and related details, various changes may be made to FIGS. 1 through 6. For example, each component in a three-quarter bridge power converter described above could be implemented in any suitable manner. Also, the waveforms shown in FIG. 2 are for illustration only, and a three-quarter bridge power converter could operate using different waveforms depending on the implementation. Further, the use of a capacitor as a mechanism for sourcing/sinking energy during operation of the power converter is for illustration only. Other energy storage elements or energy sources could also be used. For instance, in other embodiments, the capacitor can be replaced by a bidirectional converter that outputs a voltage of approximately V+/2. The bidirectional converter can source energy to the third switch 118, 318, 418 by operating in synchronous buck mode and sink energy from the switch 118, 318, 418 (and return it to V+) by operating in synchronous boost mode. Moreover, various components in FIGS. 1 through 6 could be combined, omitted, or further subdivided and additional components could be added according to particular needs. In addition, any of the power converters in this patent document could use multiple switches during normal half bridge operation to selectively couple a switch node to different voltage rails, such as a higher voltage V+ and a lower voltage (not necessarily ground).

Figure 7:
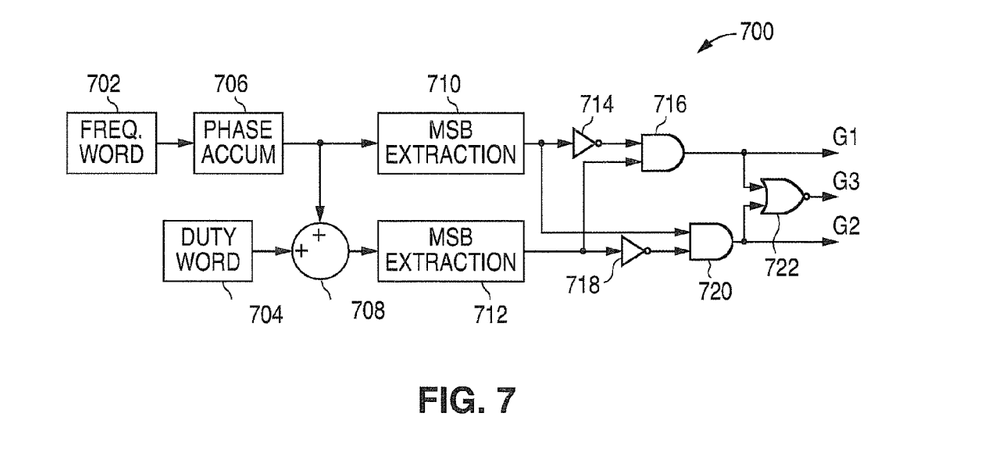
FIG. 7 illustrates an example control circuit for a three-quarter bridge power converter according to this disclosure.

FIG. 7 illustrates an example control circuit 700 for a three-quarter bridge power converter according to this disclosure. The control circuit 700 could, for example, be used to generate the control signals G1-G3 for any of the three-quarter bridge power converters described above or below. In this example, the control circuit 700 uses a hybrid analog and digital approach to generate the control signals.

As shown in FIG. 7, the control circuit 700 includes a frequency word unit 702 and a duty word unit 704. These units 702-704 output values denoting the frequency and duty cycle of a control signal used to drive the power converter. The values could represent 24-bit values. A phase accumulator 706 operates using the output of the frequency word unit 702. An output of the phase accumulator 706 is provided to an adder 708, which adds the output of the phase accumulator 706 to the output of the duty word unit 704.

A high-order bit of the phase accumulator's output is identified and extracted using a most significant bit (MSB) extraction unit 710. The high-order bit of the phase accumulator's output is used as a reference phase. A high-order bit of the adder's output is identified and extracted using an MSB extraction unit 712. The high-order bit of the adder's output is used as a variable phase.

The difference between the reference and variable phases is used to generate the control signals G1 and G2 (which here are PWM signals). In particular, the output of the MSB extraction unit 710 is provided to an inverter 714 and an AND gate 720, and the output of the inverter 714 is provided to an AND gate 716. The output of the MSB extraction unit 712 is provided to an inverter 718 and the AND gate 716, and the output of the inverter 718 is provided to the AND gate 720. The AND gates 716 and 720 output the control signals G1 and G2, respectively. The control signal G3 is generated by performing a logical NOR operation of the G1 and G2 signals using a NOR gate 722. The signal G3 is therefore asserted whenever neither G1 nor G2 is asserted. Duty factor resolution in this example could be about $1.2 \times 10^{-7}$, which is likely far better than needed.

The control signals G1, G2, and G3 in this example could have low phase jitter, such as a phase jitter of one clock period. For a 100 MHz clock, this results in a phase jitter of only 10 ns. This methodology, which is mathematically related to direct digital synthesis (DDS), can inherently implement a dithering scheme that forces the duty factor average to be exactly equal to:

$$\text{Duty} = (2 \times \text{Duty Word}) / 2^{24}$$

(assuming 24-bit values are used). For resonant converters, jitter in the load can be reduced due to the high frequency roll-off of the resonant network.

Although FIG. 7 illustrates one example of a control circuit 700 for a three-quarter bridge power converter, various changes may be made to FIG. 7. For example, any other suitable combinatorial logic or other mechanisms could be used to produce appropriate control signals. Also, various components in FIG. 7 could be combined, omitted, or further subdivided and additional components could be added according to particular needs.

The power converter topologies described above could be used in various applications. For example, a three-quarter bridge power converter could be useful in any application that might use a half bridge converter. The three-quarter bridge converter has greater efficiency for any duty factor that would result in dead time for the half bridge converter (less than a 50% duty factor).

Another application of the three-quarter bridge converter is as a substitute for full bridge converters in situations where it is desirable to connect one side of a load or one side of a transformer to ground. This may include, for example, applications where multiple transmit coils are used, and one or more coils can be selectively coupled to the bridge. An example of this is shown in FIG. 8, which illustrates an example three-quarter bridge power converter 800 with multiple transmit coils according to this disclosure.

Figure 8:
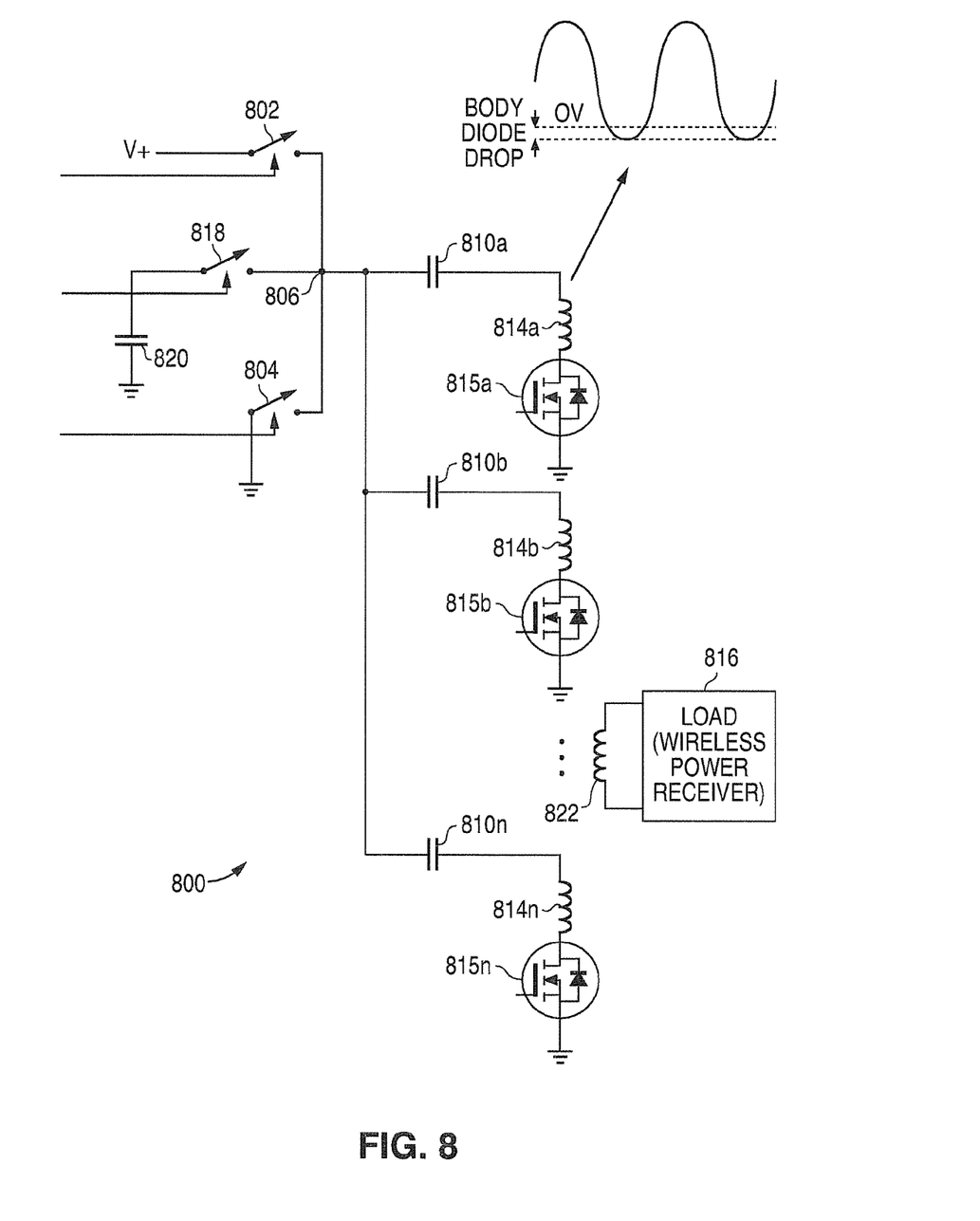
FIG. 8 illustrates an example three-quarter bridge power converter with multiple transmit coils according to this disclosure.

As shown in FIG. 8, the power converter 800 includes two switches 802-804 selectively coupling a node 806 to a source voltage V+ and ground, respectively. The node 806 is also coupled to a switch 818, which selectively couples the node 806 to an energy storage or source (such as a capacitor 820). In this example, the node 806 is coupled to multiple strings, where each string includes a coil 814a-814n (such as an inductor) and a transistor 815a-815n (such as a MOSFET) coupled in series. The coils 814a-814n represent multiple coils used to transmit power to a load 816. The coils 814a-814n could, for instance, form part of a multi-coil power transmit pad that allows great freedom in how a receive coil 822 of the load 816 is positioned with respect to the pad.

The combination of a series capacitor 810a-810n and the body diode of the transistor 815a-815n allows a DC level shift in each string, which effectively decouples that string from the rest of the circuit in FIG. 8. A small bias current (such as FET leakage) flows to maintain the disconnect. This allows single MOSFETs to be used as the transistors 815a-815n for selecting between coils 814a-814n.

Although FIG. 8 illustrates one example of a three-quarter bridge power converter 800 with multiple transmit coils, various changes may be made to FIG. 8. For example, the power converter 800 could include any number of transmit coils.

Figure 9:
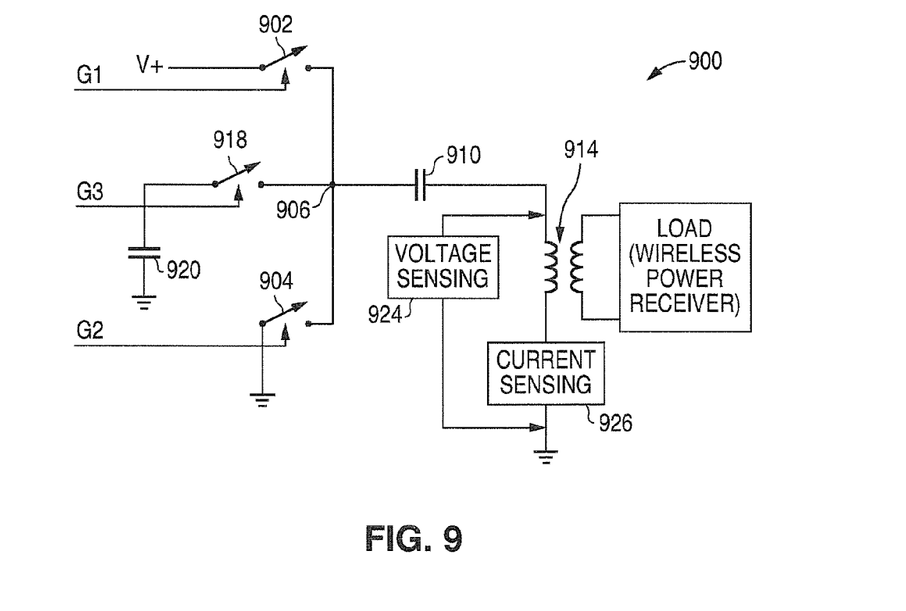
FIG. 9 illustrates an example three-quarter bridge power converter with current and voltage sensing instrumentation according to this disclosure.

Another three-quarter bridge power converter may involve the use of current and voltage sensing instrumentation, an example of which is shown in FIG. 9. In FIG. 9, a three-quarter bridge power converter 900 includes switches 902-904 coupled to a node 906, which is also coupled to a capacitor 910. The capacitor 910 is coupled to a coil 914, which could be an inductor or part of a transformer (such as a wireless power transfer coil). A switch 918 couples an energy storage or source (such as a capacitor 920) to the node 906.

In this example, a voltage sensing unit 924 is coupled across the coil 914, and a current sensing unit 926 is coupled in series with the coil 914. The voltage sensing unit 924 includes any suitable structure for measuring a voltage, and the current sensing unit 926 includes any suitable structure for measuring a current. In this example, the three-quarter bridge architecture facilitates the use of sensing units 924-926 in a single-ended fashion, meaning these units do not require the use of differential signaling. This can help to reduce or eliminate the need for high common-mode rejection in these units.

Although FIG. 9 illustrates one example of a three-quarter bridge power converter 900 with current and voltage sensing instrumentation, various changes may be made to FIG. 9. For example, the sensing units 924-926 could be used with any of the embodiments of the three-quarter bridge described above. Also, the power converter 900 could include one of the sensing units 924-926 while omitting the other.

Each component shown in the circuits above could be implemented using any suitable structure(s). Moreover, these figures illustrate example implementations of the circuits. In these circuits, components could be added, omitted, combined, further subdivided, or moved according to particular needs. In addition, the waveforms shown above are for illustration only and represent possible or simulated behaviors of specific implementations of the circuits.

Figure 10:
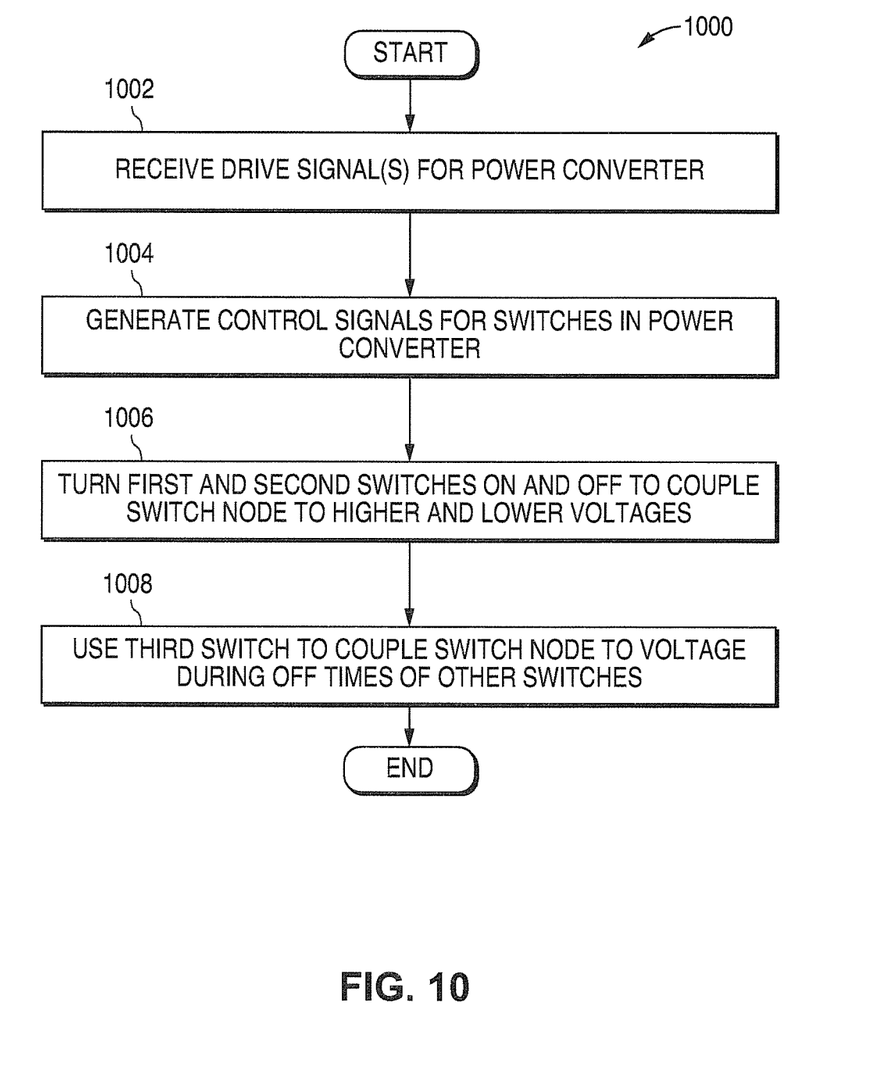
FIG. 10 illustrates an example method for power conversion using a three-quarter bridge power converter according to this disclosure.

FIG. 10 illustrates an example method 1000 for power conversion using a three-quarter bridge power converter according to this disclosure. As shown in FIG. 10, at least one drive signal is received for a three-quarter bridge power converter at step 1002. This could include, for example, an external component providing one or more signals identifying a desired frequency and duty factor for driving the three-quarter bridge power converter. The external component could denote any suitable source for controlling the power converter, such as an external processing device or controller.

Control signals for switches in the three-quarter bridge power converter are generated at step 1004. This could include, for example, a control circuit generating the G1-G3 control signals for the power converter. As a particular example, this could include the control circuit generating the G1 and G2 control signals to drive the power converter at a desired duty factor. This could also include the control circuit generating the G3 control signal so that it is active (high) whenever the G1 and G2 control signals are inactive (low).

First and second switches in the three-quarter bridge power converter are turned on and off at step 1006. This is done to couple a switch node in the power converter to higher and lower rail voltages, such as V+ and ground. The amount of time that the switch node spends coupled to the higher rail voltage versus the lower voltage rail defines the duty factor, and some dead time may exist where both the first and second switches are turned off. The first and second switches can be controlled by the G1 and G2 control signals.

A third switch is used to couple the switch node to a voltage during the off times of the first and second switches at step 1008. This could include, for example, the third switch closing so that a voltage on a capacitor is received at the switch node. The third switch can be opened whenever the switch node is coupled to a rail by either of the first and second switches. This substantially reduces or eliminates dead time in the three-quarter bridge power converter. The third switch can be controlled by the G3 control signal.

Although FIG. 10 illustrates one example of a method 1000 for power conversion using a three-quarter bridge power converter, various changes may be made to FIG. 10. For example, while shown as a series of steps, various steps in FIG. 10 could overlap, occur in parallel, occur multiple times, or occur in a different order.

It may be advantageous to set forth definitions of certain words and phrases that have been used within this patent document. The term "couple" and its derivatives refer to any direct or indirect communication between components, whether or not those components are in physical contact with each other. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A three-quarter bridge power converter circuit configured for providing regulated power to a load, comprising:
    a first switch configured to selectively couple a switch node to a higher voltage;
    a second switch configured to selectively couple the switch node to a lower voltage;
    a clamp voltage element configured to store a clamp voltage intermediate the higher and lower voltages;
    a bi-directional clamping switch configured to selectively couple the switch node to the voltage element when the first and second switches are not coupling the switch node to the higher and lower voltages, and thereby clamp the switch node to the clamp voltage; and
    a control circuit configured to generate control signals G1, G2, and G3 to cooperatively switch respectively the first and second switches and the bi-directional clamping switch, including generating G1 and G2 based on values associated with switching frequency and duty cycle, converted to respectively a reference phase value related to the switching frequency, and a variable phase value related to both the switching frequency and the duty cycle, such that
        the reference phase value and the variable phase value have a predetermined resolution,
        the difference between the reference phase value and the variable phase value is used to generate the G1 and G2 control signals,
        the G3 control signal is asserted to clamp the switch node to the clamp voltage when neither G1 nor G2 is asserted, such that the G1, G2 and G3 control signals provide a predetermined duty factor resolution.

2. The power converter of claim 1, wherein the-voltage element comprises a capacitor.

3. The power converter of claim 1, further comprising:
    a reactive element coupled between the switch node and the load.

4. The power converter of claim 3, wherein the reactive element comprises at least one coil or transformer winding.

5. The power converter of claim 4, further comprising at least one of:
    a single-ended voltage sensor configured to measure a voltage across the coil or transformer winding; and
    a single-ended current sensor configured to measure a current through the coil or transformer winding.

6. The power converter of claim 3 wherein the reactive element is a capacitor coupled between the switch node and an output node coupled to the load; and
    wherein the bi-directional clamping switch is coupled between the output node and ground, such that the capacitor comprises the voltage element.

7. The power converter of claim 1, wherein the control circuit is configured based on direct digital synthesis, and includes:
    a phase accumulator configured to receive the switching frequency value;
    an adder configured to add an output of the phase accumulator and the duty cycle value;
    at least one extraction unit configured to identify a most significant bit in an output of the phase accumulator and a most significant bit in an output of the adder, respectively corresponding to the reference phase value and the variable phase value; and
    combinatorial logic configured to generate the control signals G1, G2, and G3 using the most significant bits.

8. The power converter of claim 1, wherein:
    the higher voltage comprises a supply voltage;
    the lower voltage comprises ground; and
    the clamp voltage is approximately one-half of the supply voltage.

9. A system comprising:
    a load; and
    a three-quarter bridge power converter configured to provide power to the load, the power converter comprising:
        a first switch configured to selectively couple a switch node to a higher voltage;
        a second switch configured to selectively couple the switch node to a lower voltage;
        a clamp voltage element configured to store a clamp voltage intermediate the higher and lower voltages;
        a bi-directional clamping switch configured to selectively couple the switch node to the voltage element when the first and second switches are not coupling the switch node to the higher and lower voltages, and thereby clamp the switch node to the clamp voltage; and
        a control circuit configured to generate control signals G1, G2, and G3 to cooperatively switch respectively the first and second switches and the bi-directional clamping switch, including generating G1 and G2 based on values associated with switching frequency and duty cycle, converted to respectively a reference phase value related to the switching frequency, and a variable phase value related to both the switching frequency and the duty cycle, such that
            the reference phase value and the variable phase value have a predetermined resolution,
            the difference between the reference phase value and the variable phase value is used to generate the G1 and G2 control signals,
        the G3 control signal is asserted to clamp the switch node to the clamp voltage when neither G1 nor G2 is asserted, such that the G1, G2 and G3 control signals provide a predetermined duty factor resolution.

10. The system of claim 9, wherein the voltage element comprises a capacitor.

11. The system of claim 9, further comprising:
    a reactive element coupled between the switch node and the load.

12. The system of claim 11, wherein the reactive element comprises at least one coil or transformer winding.

13. The system of claim 12, wherein the power converter further comprises at least one of:
    a single-ended voltage sensor configured to measure a voltage across the coil or transformer winding; and
    a single-ended current sensor configured to measure a current through the coil or transformer winding.

14. The system of claim 11:
    wherein the reactive element is a capacitor coupled between the switch node and an output node coupled to the load; and
    wherein the bi-directional clamping switch is coupled between the output node and ground, such that the capacitor comprises the voltage element.

15. The system of claim 9, wherein the control circuit is configured based on direct digital synthesis, and includes:
    a phase accumulator configured to receive the switching frequency value;
    an adder configured to add an output of the phase accumulator and the duty cycle value;
    at least one extraction unit configured to identify a most significant bit in an output of the phase accumulator and a most significant bit in an output of the adder, respectively corresponding to the reference phase value and the variable phase value; and combinatorial logic configured to generate the control signals G1, G2, and G3 using the most significant bits.

16. The system of claim 9, wherein:

the three-quarter bridge power converter comprises a portion of a wireless power transmitter including a matrix comprising multiple transmit coils or transformer windings; and the load comprises a wireless power receiver.

17. The system of claim 16, wherein the higher voltage comprises a supply voltage;

the lower voltage comprises ground; and the clamp voltage is approximately one-half of the supply voltage.

18. A method of half-bridge power conversion, comprising:

repeatedly coupling a switch node to a higher voltage and a lower voltage using first and second switches, respectively; and selectively coupling the switch node to a clamp voltage intermediate the higher and lower voltages using a bi-directional clamping switch when the first and second switches are not coupling the switch node to the higher and lower voltages, and thereby clamping the switch node to the clamp voltage, by generating control signals G1, G2, and G3 to cooperatively switch respectively the first and second switches and the bi-directional clamping switch, including generating G1 and G2 based on values associated with switching frequency and duty cycle converted to respectively a reference phase value related to the switching frequency, and a variable phase value related to both the switching frequency and the duty cycle, such that the reference phase value and the variable phase value have a predetermined resolution, the difference between the reference phase value and the variable phase value is used to generate the G1 and G2 control signals, and asserting the G3 control signal to clamp the switch node to the clamp voltage when neither G1 nor G2 is asserted, such that the G1, G2 and G3 control signals provide a predetermined duty factor resolution.

19. The method of claim 18, further comprising a capacitor coupled between the switch node and an output node coupled to the load, and wherein:

selectively coupling the switch node to a clamp voltage is accomplished by selectively coupling the output node to ground, such that a voltage on the capacitor comprises the clamp voltage.

20. The method of claim 18, adapted for use in a wireless power transmitter that includes a matrix comprising multiple transmit coils or transformer windings, such that wireless power is supplied to a load comprising a wireless power receiver.

* * * * *